(12) United States Patent
Hur

(10) Patent No.: US 8,134,806 B2
(45) Date of Patent: Mar. 13, 2012

(54) HARD DISK DRIVE

(75) Inventor: Sung Chul Hur, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 77 days.

(21) Appl. No.: 12/848,339

(22) Filed: Aug. 2, 2010

(65) Prior Publication Data

US 2011/0096442 A1    Apr. 28, 2011

(30) Foreign Application Priority Data

Oct. 28, 2009   (KR) .............................. 2009-0102787

(51) Int. Cl.
*G11B 5/54* (2006.01)
(52) U.S. Cl. .................. 360/256.2; 360/256; 360/256.4
(58) Field of Classification Search .................. 360/256, 360/256.1–256.2, 256.4, 265.1, 265.4, 265.6–265.7
See application file for complete search history.

(56) References Cited

U.S. PATENT DOCUMENTS

| 6,801,403 | B2 | 10/2004 | Miyajima |
| 6,917,497 | B1 * | 7/2005 | Johnson et al. ............ 360/256.4 |
| 7,532,439 | B2 * | 5/2009 | Byun et al. ................. 360/256.4 |

FOREIGN PATENT DOCUMENTS

| JP | 11-353826 | 12/1999 |
| KR | 100192668 | 1/1999 |
| KR | 100288287 | 2/2001 |

* cited by examiner

*Primary Examiner* — Daniell L Negron
*Assistant Examiner* — Carlos E Garcia
(74) *Attorney, Agent, or Firm* — Stanzione & Kim, LLP

(57) ABSTRACT

A hard disk drive includes a base, an actuator arm pivotably installed on the base, and a latch device to latch the actuator arm at a parking position. The latch device includes a latch stop that protrudes from a side wall of the base and has an inclined surface, and a latch lever pivotably installed on the base and contacts and slides along the inclined surface of the latch stop during the rotation in an unlatching direction.

11 Claims, 11 Drawing Sheets

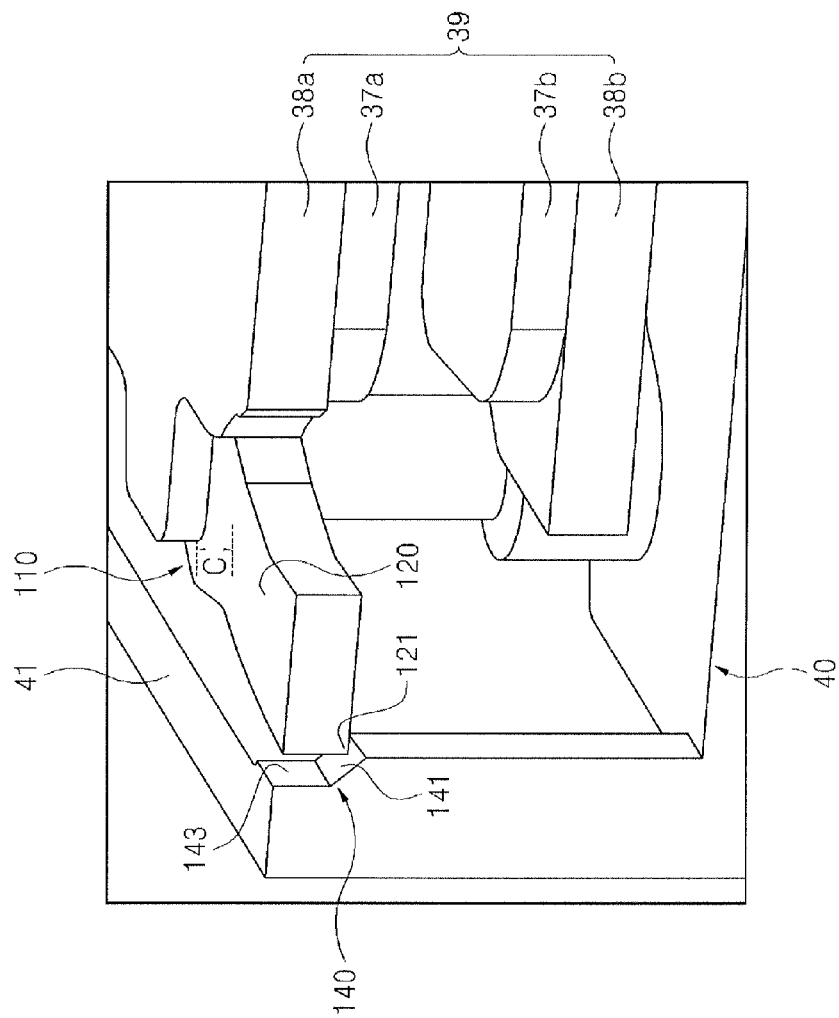

HARD DISK DRIVE

CROSS-REFERENCE TO RELATED APPLICATIONS

This application claims the benefit of Korean Patent Application No. 10-2009-0102787, filed on Oct. 28, 2009, in the Korean Intellectual Property Office, the disclosure of which is incorporated herein in its entirety by reference.

BACKGROUND

1. Field of the Invention

The inventive concept relates to a hard disk drive, and more particularly, to the structure of a latch device of a hard disk drive.

2. Description of the Related Art

Hard disk drives (HDDs) are one of information storage devices. The HDD records data on a disk, or reads the data stored in the disk, by using a magnetic head. In the HDD, while flying at a predetermined height above a recording surface of a rotating disk, the magnetic head is moved by an actuator arm to a desired position to perform the above functions.

When the HDD is not in operation, that is, the rotation of a disk is stopped, the magnetic head is parked at a position out of the recording surface of the disk to prevent the magnetic head from colliding against the recording surface of the disk. The parking system of the magnetic head may include a contact start stop (CSS) method and a ramp loading method. In the CSS method, a parking zone where data is not recorded is provided at the inner circumferential side of the disk and the magnetic head is parked in the parking zone by contacting the parking zone. In the ramp loading method, a ramp is installed outside the disk and the magnetic head is parked on the ramp.

When the magnetic head is parked in the parking zone of a disk or on the ramp as described above, an external shock or vibration is applied to the HDD so that the actuator arm is freely moved and thus the magnetic head escapes from the parking zone or ramp to move over the recording surface of the disk. In this case, the magnetic head contacts the recording surface of the disk so that the magnetic head or the recording surface of the disk may be damaged. Thus, when the rotation of the disk is stopped and the magnetic head is parked in the parking zone or on the ramp, there is a need to latch the actuator arm at the parking position not to be freely rotated. To this end, a variety of latch devices are provided in the HDD.

A latch device includes a latch lever pivotably installed on a base of the HDD to confine a rear end portion of the actuator arm at the parking position. The latch lever is arranged between the base and a top yoke of a voice coil motor (VCM). A predetermined clearance (hereinafter, referred to as the upper clearance of the latch lever) for smooth rotation of the latch lever exists between the latch lever and the top yoke.

Although the upper clearance of the latch lever is necessary for the smooth rotation of the latch lever, the latch lever may be shaken in a vertical direction or vibrate when an external shock or vibration is applied to the HDD. As the latch lever is shaken in a vertical direction or vibrates, the latch lever collides against the base and/or the top yoke. An internal shock caused by the above collision may generate an error during a recording operation or reading operation of the HDD.

SUMMARY

The inventive concept provides a hard disk drive which may prevent a phenomenon in which an error is generated during the recording operation or reading operation of the HDD due to the internal shock that is generated as the latch lever is shaken in the vertical direction or vibrates, in the state in which a latch device is unlatched.

According to an aspect of the inventive concept, there is provided a hard disk drive including a base, an actuator arm pivotably installed on the base, and a latch device to latch the actuator arm at a parking position, wherein the latch device includes a latch stop protruding from a side wall of the base and having an inclined surface, and a latch lever pivotably installed on the base and contacting and sliding along the inclined surface of the latch stop during the rotation in an unlatching direction.

The inclined surface of the latch stop may be a flat surface.

The inclined surface of the latch stop may have an inclination angle within a range of 15-25 degrees.

The inclined surface of the latch stop may be a curved surface that is curved inwardly toward the base.

An accommodation groove in which the latch lever is accommodated may be formed in the inclined surface of the latch stop to stably maintain an ascending position of the latch lever in an unlatching state.

The accommodation groove of the latch stop may have a V shape.

The latch lever may include a latch arm having a contact end portion contacting the latch stop in the unlatching state, and a counterbalance disposed at the opposite side of the latch arm with respect to a rotation center of the latch lever.

The contact end portion of the latch arm may have a chamfer surface to allow the latch lever to smoothly ascend along the inclined surface of the latch stop during the rotation in the unlatching direction.

Torque to rotate the latch lever in the unlatching direction may be provided by a magnetic force acting between a steel core provided in the counterbalance and a magnet provided in a voice coil motor.

The latch lever may ascend along the inclined surface of the latch stop to a position where an upper clearance of the latch lever is removed during the rotation in the unlatching direction.

The latch lever may be arranged between a top yoke of a voice coil motor and the base, and the upper clearance is a gap between the latch lever and the top yoke

BRIEF DESCRIPTION OF THE DRAWINGS

Exemplary embodiments of the inventive concept will be more clearly understood from the following detailed description taken in conjunction with the accompanying drawings in which:

FIG. 5 is a partially sectioned perspective view taken along line V-V of FIG. 3;

DETAILED DESCRIPTION OF THE EMBODIMENTS

Figure 1:
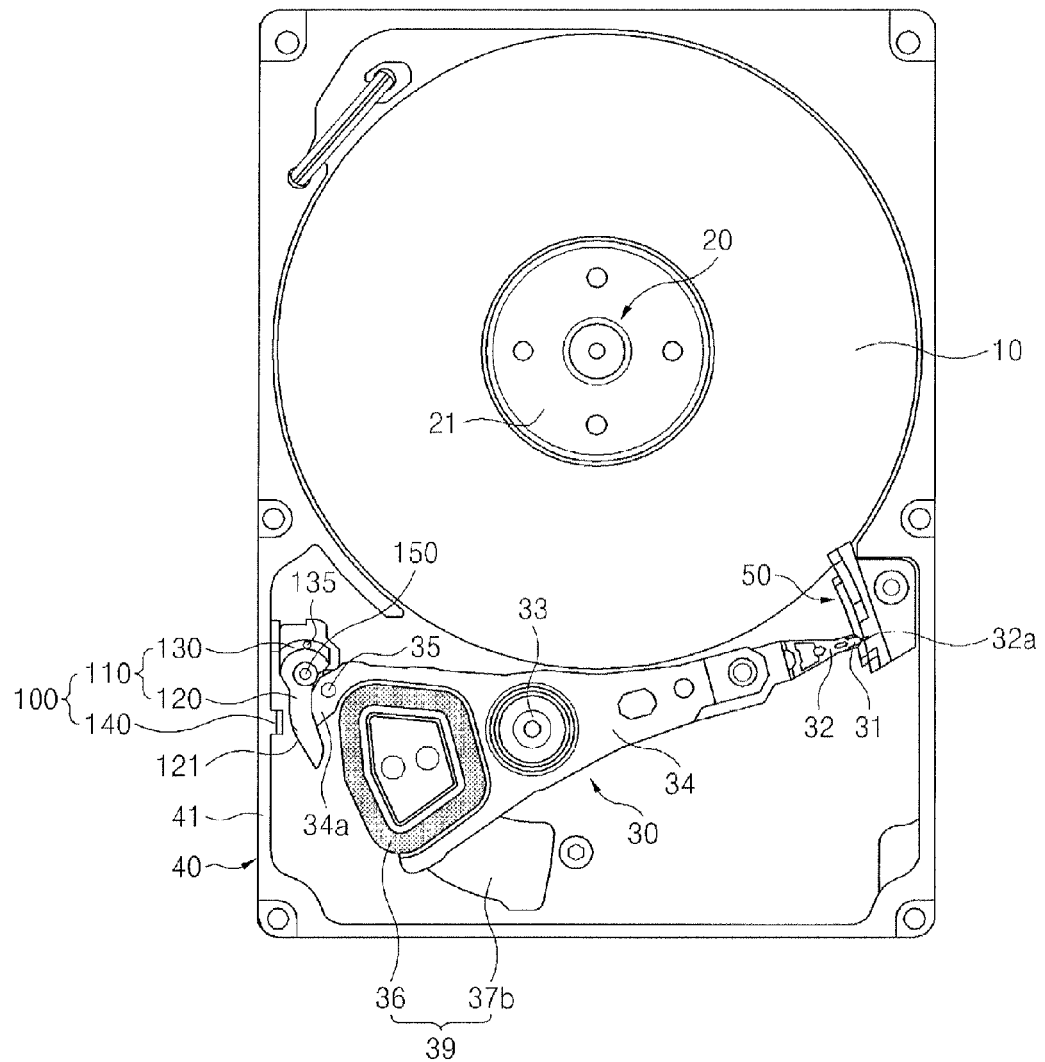
FIG. 1 is a plan view schematically illustrating the latched state of an HDD according to an exemplary embodiment of the inventive concept.

The attached drawings for illustrating embodiments of the inventive concept are referred to in order to gain a sufficient understanding of the inventive concept and the merits thereof. Hereinafter, the inventive concept will be described in detail by explaining embodiments of the inventive concept with reference to the attached drawings. Like reference numerals in the drawings denote like elements.

Figure 2:
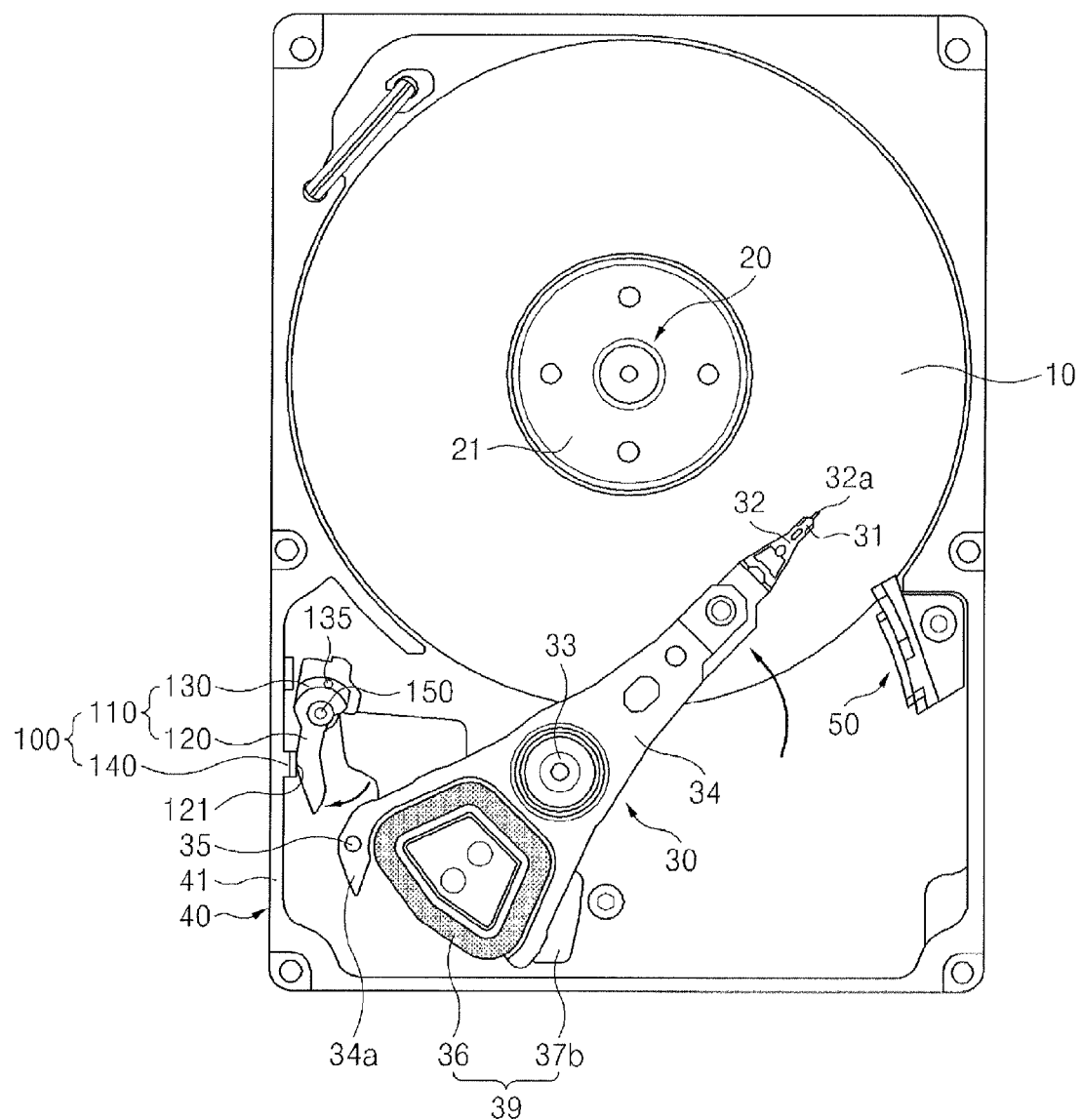
FIG. 2 is a plan view schematically illustrating the unlatching state of the HDD of FIG. 1.
Figure 3:
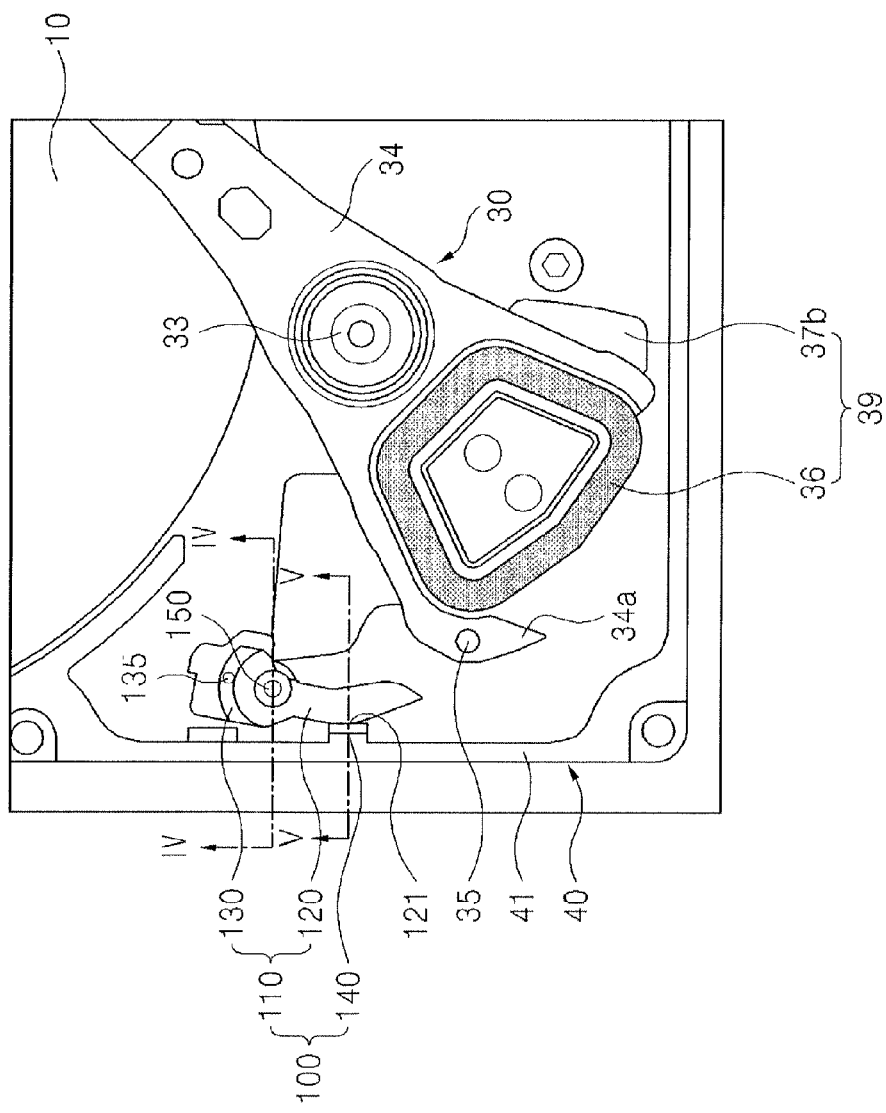
FIG. 3 is a partially plan view illustrating the latch device of the HDD of FIG. 1.
Figure 4:
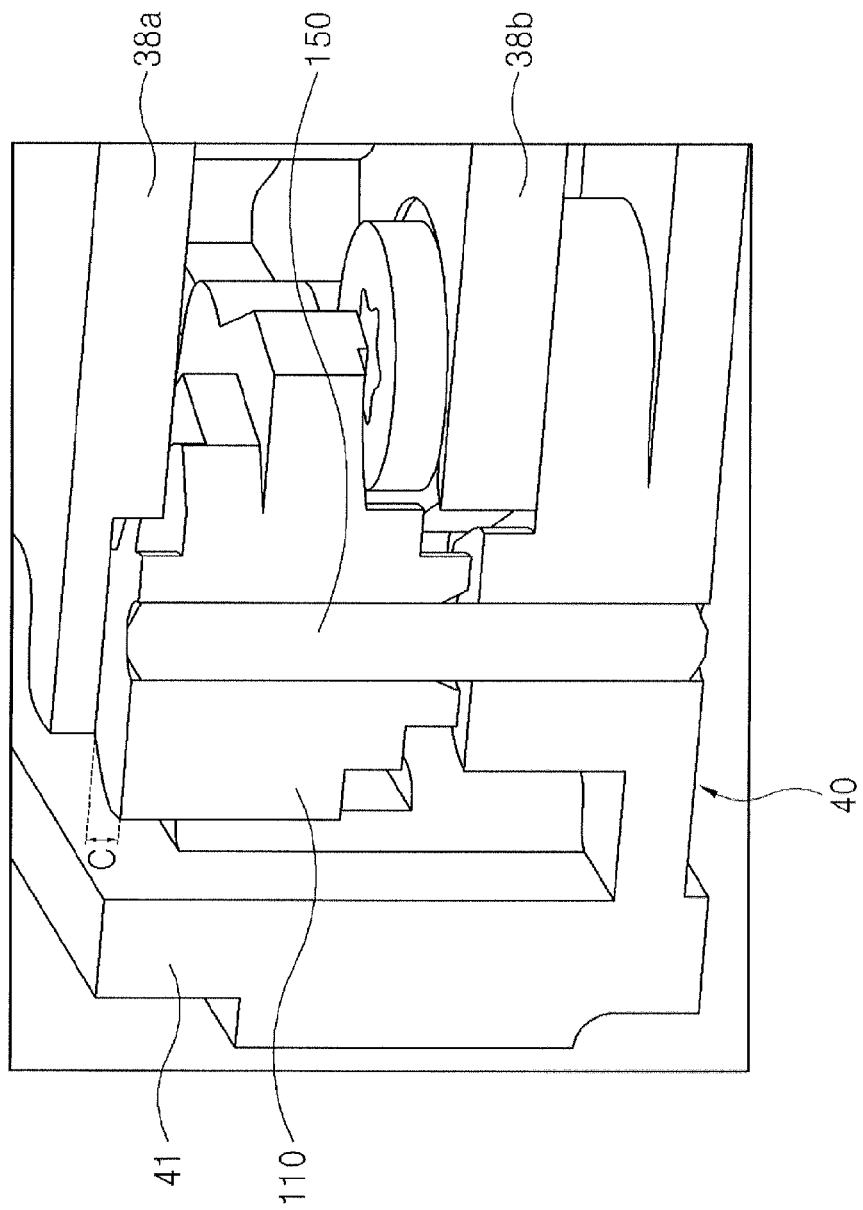
FIG. 4 is a partially sectioned perspective view taken along line IV-IV of FIG. 3.
Figure 6A:
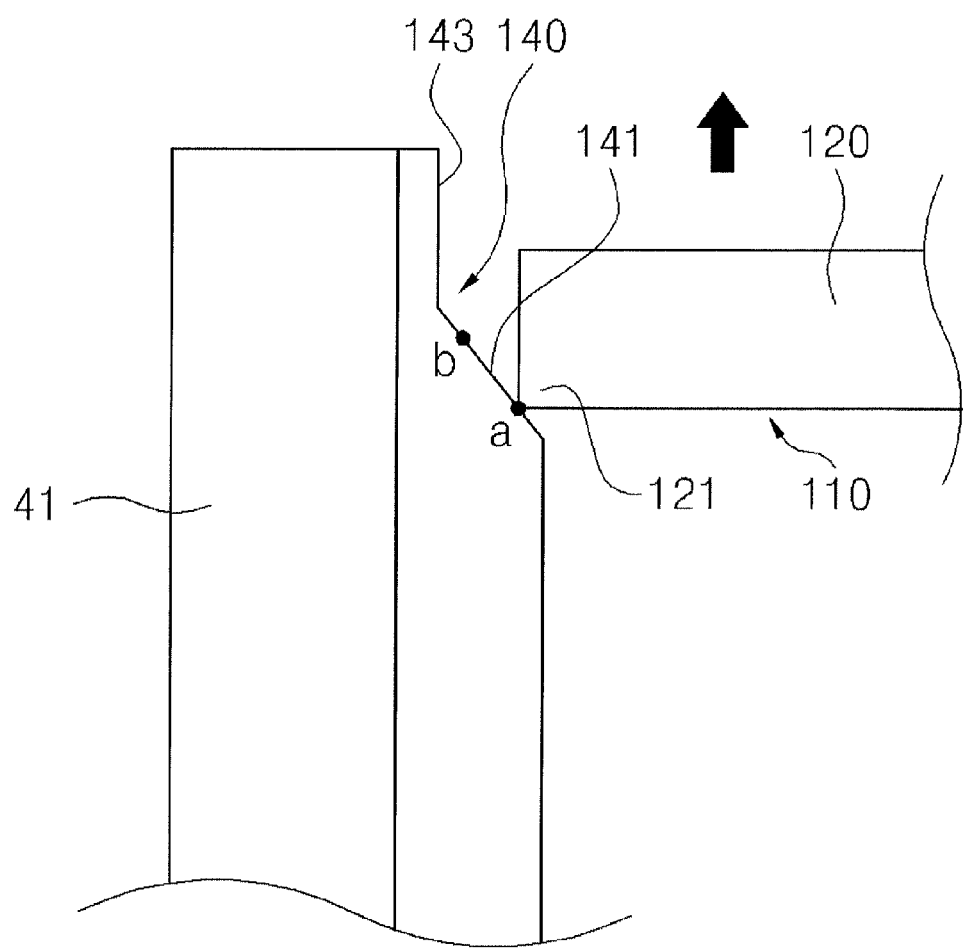
FIGS. 6A and 6B are schematic views for explaining the operation of the latch device in the HDD of FIG. 1.
Figure 6B:
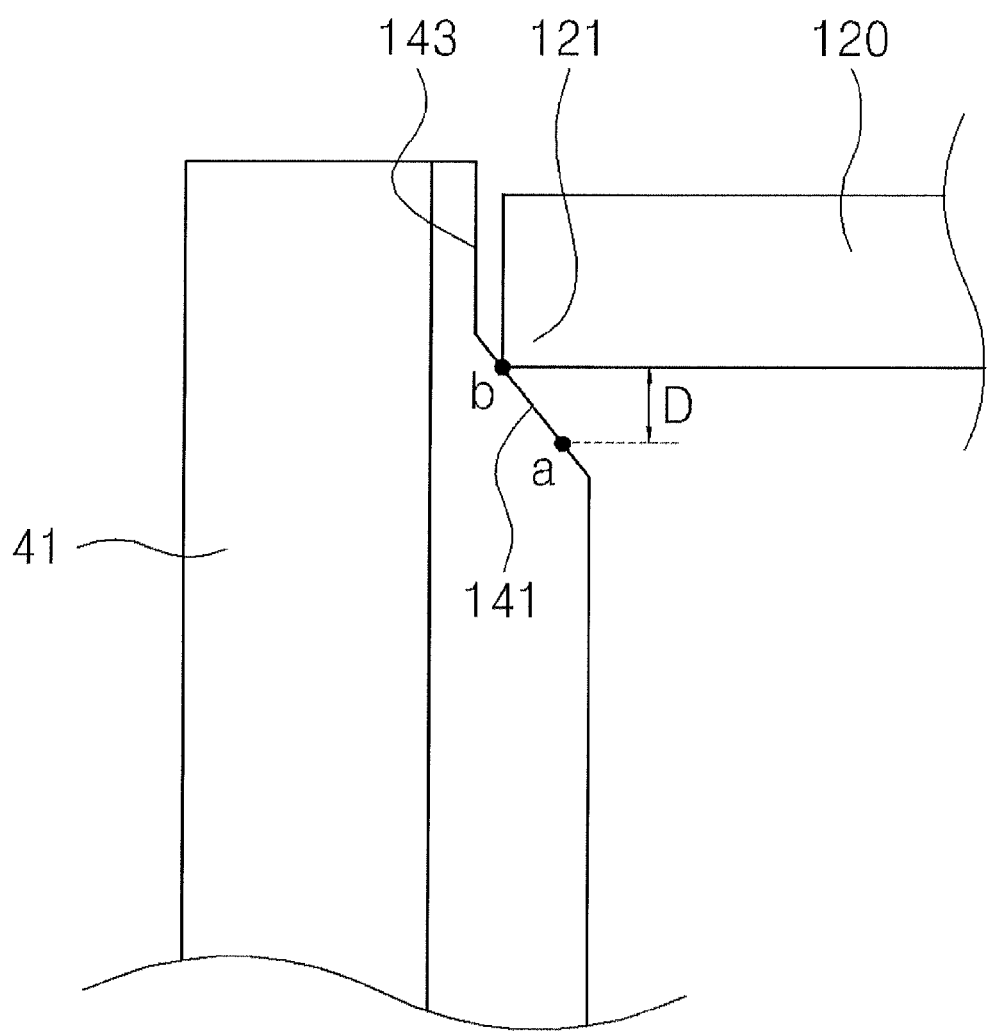

FIG. 1 is a plan view schematically illustrating the latched state of an HDD 1 according to an exemplary embodiment of the inventive concept. FIG. 2 is a plan view schematically illustrating the unlatching state of the HDD 1 of FIG. 1. FIG. 3 is a partially plan view illustrating the latch device of the HDD 1 of FIG. 1. FIG. 4 is a partially sectioned perspective view taken along line IV-IV of FIG. 3. FIG. 5 is a partially sectioned perspective view taken along line V-V of FIG. 3. FIGS. 6A and 6B are schematic views for explaining the operation of the latch device in the HDD 1 of FIG. 1.

Referring to FIGS. 1 and 2, the HDD 1 of the present exemplary embodiment includes a disk 10 for recording data, a spindle motor 20 for rotating the disk 10, a head stack assembly (HSA) 30 to move a magnetic head (not shown) that records data on the disk 10 or reads the data from the disk 10, to a predetermined position on the disk 10, a ramp 50 provided in an area outside the disk 10 to park the magnetic head in a state in which the rotation of the disk 10 is stopped, a latch device 100 to latch the HSA 30 to a parking position, a base 40 providing a frame where constituent elements are installed, and a cover (not shown) for covering the base 40.

FIGS. 1 and 2 illustrate a state in which the cover covering the base 40 is removed. A top yoke 38a (refer to FIG. 4) of a voice coil motor (VCM) 39 is removed for easy understanding of the structure of the HSA 30.

Referring to FIGS. 1 and 2, one or more number of the disk 10 may be vertically stacked on a hub (not shown) of the spindle motor 20. When a plurality of disks are provided as the disk 10, the disks are separated by a ring shaped spacer (not shown) from each other and supported by the hub of the spindle motor 20. The disk 10 is fixed to the hub of the spindle motor 20 by a clamp 21 arranged in the central area of the disk 10.

Referring to FIGS. 1-3, the HSA 30 includes a slider 31 having the magnetic head to record data on the disk 10 or read the data from the disk 10 and to allow the magnetic head to fly above the disk 10, a suspension 32 to elastically support the slider 31 against the surface of the disk 10, an actuator arm 34 to support the suspension 32 and pivotably installed on the base 40 to allow the magnetic head to access a desired position on the disk 10, a pivot shaft 33 pivotably supporting the actuator arm 34, and the VCM 39 functioning as an actuator to drive the actuator arm 34.

Although it is not illustrated in the accompanying drawings, the magnetic head is mounted on a lower side of the slider 31 and records data on the disk 10 by magnetizing the surface of the disk 10 or reads the data from the disk 10 by sensing the magnetic field formed on the surface of the disk 10. The magnetic head substantially includes a write head to magnetize the disk 10 and a read head to sense the magnetic field of the disk 10.

Referring to FIGS. 3-5, the VCM 39 includes a VCM coil 36 provided at the rear end portion of the actuator arm 34, top and bottom yokes 38a and 38b fixedly installed at the base 40 to respectively cover the upper and lower portions of the VCM coil 36, and upper and lower magnets 37a and 37b respectively attached to the top and bottom yokes 38a and 38b, thereby facing the VCM coil 36. However, only one magnet may be arranged at either the upper portion or the lower portion of the VCM coil 36.

The VCM 39 is controlled by a servo control system. The actuator arm 34 is rotated in a direction following the Fleming's left hand rule by reciprocal action between current input to the VCM coil 36 and the magnetic field formed by the magnets 37a and 37b.

In the above structure, when the power of the HDD 1 is on and thus the disk 10 starts to rotate, the VCM 39 rotates the actuator arm 34 counterclockwise around the pivot shaft 33 so as to move the magnetic head to a predetermined position on the disk 10 (refer to FIG. 2). The magnetic head flies above the recording surface of the disk 10 with a predetermined clearance therebetween by a lift force generated during the rotation of the disk 10. In doing so, the magnetic head records data on the disk 10 or read the data from the disk 10.

In contrast, when the power of the HDD 1 is off and thus the rotation of the disk 1 stops, the VCM 39 rotates the actuator arm 34 clockwise around the pivot shaft 33 to make the magnetic head out of the disk 10. The magnetic head is parked on the ramp 50 as an end tap 32a formed at a leading end portion of the suspension 32 is supported by the ramp 50.

When an external shock or vibration is applied to the HDD 1 in which the magnetic head is at a parking position or the actuator arm 34 is at a parking position, the end tap 32a escapes from the ramp 50 and the actuator arm 34 rotates counterclockwise so that the magnetic head may escape from the ramp 50 and move over the recording surface of the disk 10. Since the rotation of the disk 10 is stopped, the magnetic head does not fly above the recording surface of the disk 10, but collides against the disk 10, thereby damaging the magnetic head and/or the disk 10 and deteriorating reliability of performance of the HDD 1.

To prevent the phenomenon in which the magnetic head escapes from the ramp 50 due to an external shock or vibration to move over the recording surface of the disk 10 in the state in which the rotation of the disk 10 is stopped, that is, in the parking state, the HDD 1 according to the present exemplary embodiment includes the latch device 100. In other words, the latch device 100 is a constituent element to latch the actuator arm 34 at a parking position by locking the actuator arm 34 to maintain the magnetic head installed at the actuator arm 34 to be parked on the ramp 50.

Referring to FIGS. 1-5, the latch device 100 includes a latch lever 110 pivotably installed on the base 40 to confine the rear end portion of the actuator arm 34 in a latched state, a latch rotation axis 150 installed on the base 40 to penetrate the latch lever 110, thereby providing the rotation center of the latch lever 110, and a latch stop 140 protruding from a side wall 41 of the base 40 and contacting and supporting the latch lever 110 in the unlatching state.

The latch lever 110, as illustrated in FIGS. 4 and 5, is arranged between the base 40 and the top yoke 38a of the VCM 39. A predetermined clearance C exists between the latch lever 110 and the top yoke 38a for smooth rotation of the latch lever 110, which is referred to as the upper clearance C of the latch lever 110.

The latch lever 110, which is pivotably installed on the base 40 to confine the read end portion of the actuator arm 34 in the latched state, includes a latch arm 120 extending toward one side from the rotation center of the latch lever 110 and a counterbalance 130 extending toward the other side from the rotation center of the latch lever 110.

The latch arm 120 includes a hook (not shown) perpendicularly and downwardly bent and extending from the top end of the latch arm 120 and caught by a notch 34a of the actuator arm 34 in the latched state as illustrated in FIG. 1, and a contact end portion 121 contacting the latch stop 140 in the unlatching state as illustrated in FIG. 2.

A steel core 135 that is a magnetic body formed of a SUS material is provided in the counterbalance 130. The steel core 135 of the counterbalance 130 provides torque to rotate the latch lever 110 in an unlatching direction (clockwise) by reciprocal action with the magnets 37a and 37b provided in the VCM 39. In other words, the latch lever 110 receives a force to rotate in the unlatching direction (clockwise) around the latch rotation axis 150 by a magnetic force acting between the steel core 135 of the counterbalance 130 and the magnets 37a and 37b of the VCM 39. For reference, the "unlatching direction" of the latch lever 110 signifies a direction in which the latch lever 110 rotates during the unlatching operation of the latch device 100. In the present exemplary embodiment, the unlatching direction denotes the clockwise direction because the latch device 100 is installed in the lower left area of the base 40.

The latch stop 140 protrudes from the side wall of the base 40 and is separated a predetermined distance from the latch arm 120 of the latch lever 110 in the latched state as illustrated in FIG. 1. As illustrated in FIG. 2, when the latch lever 110 rotates in the unlatching direction (clockwise) and enters in the unlatching state, the latch stop 140 contacts the latch arm 120 of the latch lever 110.

The latch stop 140, as illustrated in FIG. 5, includes an inclined surface 141 inclined upward and a vertical surface 143 vertically and upward extending from the inclined surface 141. The inclined surface 141 of the latch stop 140 contacts a contact end portion 121 of the latch arm 120 that constitutes the latch lever 110, in the unlatching state as illustrated in FIGS. 2 and 3.

The inclined surface 141 of the latch stop 140 contacts and supports the latch lever 110 that receives a force to rotate in the unlatching direction (clockwise) by a magnetic force between the steel core 135 of the latch lever 110 and the magnets 37a and 37b of the VCM 39. Accordingly, during the rotation in the unlatching direction (clockwise), the latch lever 110 contacts the inclined surface 141 of the latch stop 140 and ascends along the inclined surface 141 (refer to FIGS. 6A and 6B). Thus, the upper clearance C of the latch lever 110 is gradually decreased and finally removed. In other words, when the latch lever 110 rotates in the unlatching direction (clockwise), the latch stop 140 contacts and supports the latch lever 110 and ascends along the inclined surface 141. Thus, the upper clearance C of the latch lever 110 is decreased, preferably removed completely.

Accordingly, in the latch device 100 according to the present exemplary embodiment, even when an external shock or vibration is applied to the HDD 1 in the unlatching state, the latch lever 110 is no longer shaken or vibrated in the vertical direction. Thus, the phenomenon in which an error is generated during the recording or reading operation of the HDD 1 due to an internal shock generated as the latch lever 110 is shaken in the vertical direction may be prevented. A detailed description thereof will be described with a description about the operation of the latch device 100 that will be described later.

The inclined surface 141 of the latch stop 140 is a flat surface. The inclination angle of the inclined surface 141 may be chosen by considering a frictional force between the contact end portion 121 of the latch arm 120 and the inclined surface 141 of the latch stop 140 so that the latch lever 110 may smoothly ascend along the inclined surface 141 to a position where the upper clearance C of the latch lever 110 is completely removed. According to an experiment, the inclined surface 141 of the latch stop 140 may have an inclination angle within a range of 15-25 degrees. Alternatively, the inclined surface 141 of the latch stop 140 may be curved. For example, when the inclined surface 141 of the latch stop 140 is curved inwardly toward the base 40, the ascending position of the latch lever 110 may be more stably maintained.

In the operation of the latch device 100 according to the present exemplary embodiment, first, the operation to latch the actuator arm 34 is described with reference to FIG. 1. When the power of the HDD 1 is off and thus the rotation of the disk 10 is stopped, the actuator arm 34 is rotated clockwise, thereby parking the magnetic head mounted on the leading end portion of the actuator arm 34 may be parked on the ramp 50. The rear end portion of the actuator arm 34 contacts the counterbalance 130 of the latch lever 110. The latch lever 110 is pushed by the actuator arm 34 that rotates clockwise, to be rotated in the latch direction (counterclockwise) around the latch rotation axis 150, and finally stopped at the position where the counterbalance 130 of the latch lever 110 is contacted and supported by the side wall 41 of the base 40. Accordingly, the notch 34a of the actuator arm 34 is caught by the hook formed on the latch arm 120 of the latch lever 110 so that the actuator arm 34 may maintain a latch state.

A steel core 35 that is a magnetic body formed of a SUS material is provided at the rear end portion of the actuator arm 34. The steel core 35 of the actuator arm 34 provides torque to rotate the actuator arm 34 clockwise by the reciprocal action with the magnets 37a and 37b of the VCM 39 so that the latch state of the actuator arm 34 may be further stably maintained.

Next, the operation to unlatch the actuator arm 34 will be described with reference to FIGS. 2 through 6A and 6B. When the power of the HDD 1 is on and thus the disk 10 starts to rotate, the actuator arm 34 is rotated counterclockwise, overcoming the clockwise torque by the magnetic force acting between the steel core 35 provided at the rear end portion of the actuator arm 34 and the magnets 37a and 37b. In doing so, the latch lever 110 is released from the rear end portion of the actuator arm 34 and is rotated in the unlatching direction (clockwise) by the magnetic force acting between the steel core 135 of the counterbalance 130 of the latch lever 110 and the magnets 37a and 37b. Thus, the notch 34a of the actuator arm 34 rotating counterclockwise and the hook formed in the latch arm 120 of the latch lever 110 are not interfered with each other.

The latch lever 110 rotates in the unlatching direction (clockwise) and contacts a position "a" on the inclined surface 141 of the latch stop 140 as illustrated in FIG. 6A. After contacting the position "a" on the inclined surface 141 of the latch stop 140, the latch lever 110 continuously receives a force to rotate in the unlatching direction (clockwise) by the magnetic force between the steel core 135 of the latch lever 110 and the magnets 37a and 37b of the VCM 39. Accordingly, the latch lever 110 ascends along the inclined surface 141 to a position "b" on the inclined surface 141 of the latch stop 140 as illustrated in FIG. 6B. The position "b" denotes a position where the upper clearance C of the latch lever 110 (refer to FIG. 5), that is, the clearance between the latch lever 110 and the top yoke 38a, is removed. That is, the distance D between the position "a" and the position "b" is substantially the same as the upper clearance C of the latch lever 110. At the position "b", the latch lever 110 contacts the top yoke 38a fixedly installed on the base 40 so that the upward movement of the latch lever 110 may be prevented by the top yoke 38a, thereby standing still without further ascending. According to FIG. 6B, at the position "b" where the upper clearance C of the latch lever 110 is removed, the latch arm 120 of the latch lever 110 is separated from the vertical surface 143 of the latch stop 140. Alternatively, the latch arm 120 of the latch stop 140 may be configured to contact the vertical surface 143 of the latch stop 140 at the position "b" where the upper clearance C of the latch lever 110 is removed.

Finally, since the latch lever 110 rotating in the unlatching direction (clockwise) stands still in contact with the inclined surface 141 of the latch stop 140 at the position "b" where the upper clearance C of the latch lever 110 is removed, the unlatching operation of the latch device 100 according to an exemplary embodiment is completed.

Even when the latch device 100 according to the present exemplary embodiment stands still before the position "b" where the upper clearance C of the latch lever 110 is removed by failing to completely overcome the frictional force between the contact end portion 121 of the latch arm 120 and the inclined surface 141 of the latch stop 140 during the unlatching operation, the latch lever 110 continuously receives a force to rotate in the unlatching direction (clockwise). In this state, when an external shock or vibration is applied to the HDD 1, the latch lever 110 may reach the position "b" by ascending along the inclined surface 141 of the latch stop 140.

As described above, since the HDD 1 according to the present exemplary embodiment includes the latch stop 140 having the inclined surface 141 and the latch lever 110 that contacts the inclined surface 141 of the latch stop 140 and ascends along the inclined surface 141 during the rotation in the unlatching direction, the upper clearance C of the latch lever 110 is removed in the unlatching state of the latch device 100. Thus, when an external shock or vibration is applied to the HDD 1, the latch lever 110 is prevented from being shaken or vibrating in the vertical direction. Accordingly, the phenomenon, in which an error is generated during the recording operation or reading operation of the HDD 1 due to the internal shock that is generated as the latch lever 110 is shaken or vibrates in the vertical direction, may be prevented.

Figure 7A:
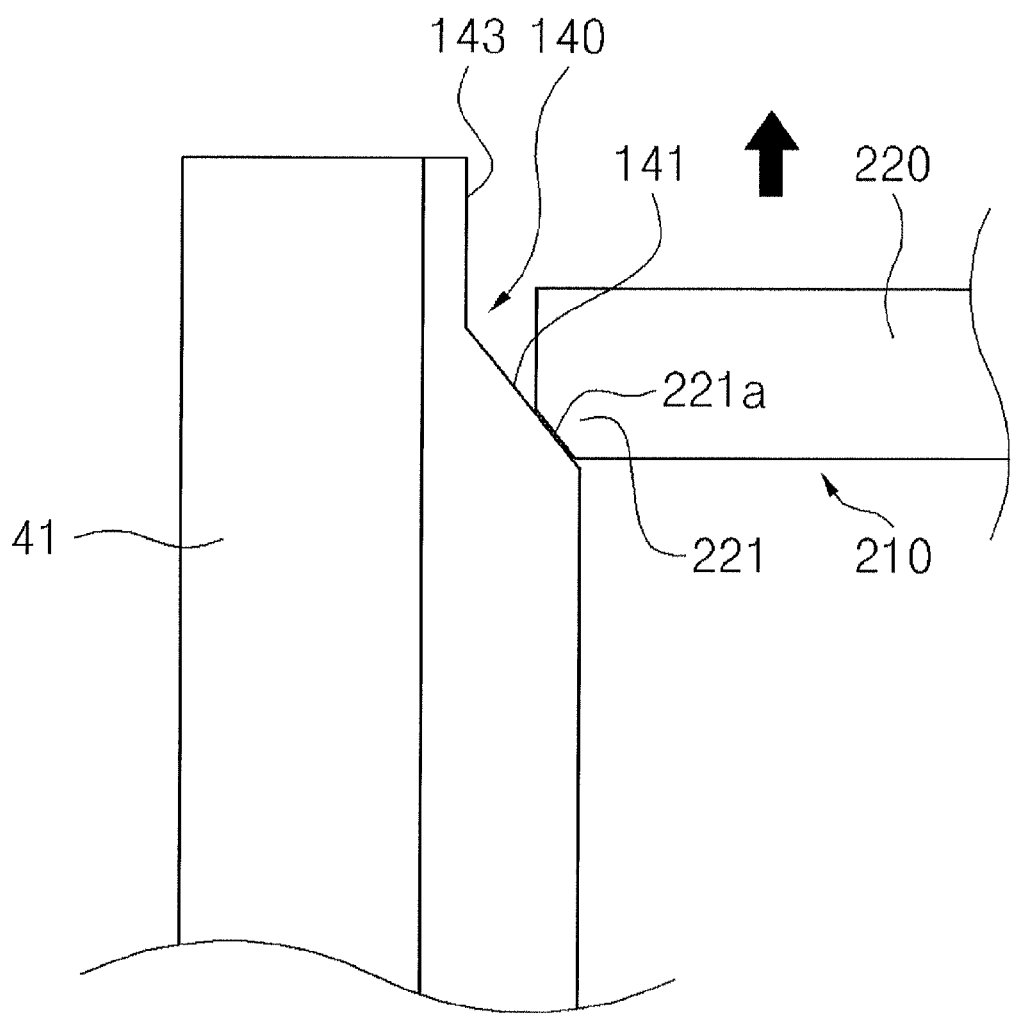
FIGS. 7A and 7B are schematic views explaining the operation of a latch device according to another exemplary embodiment of the present inventive concept.
Figure 7B:
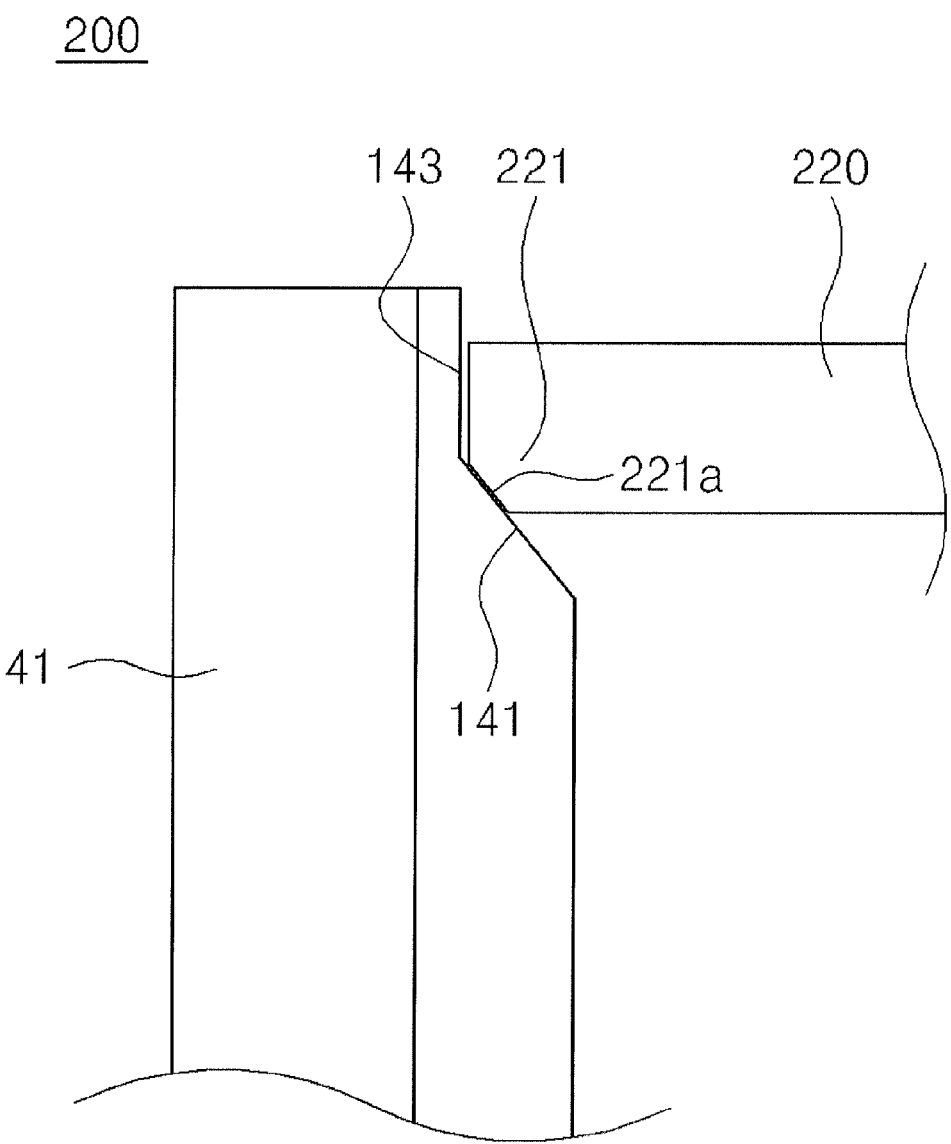

FIGS. 7A and 7B are schematic views for explaining the operation of a latch device 200 according to another exemplary embodiment of the present inventive concept. Referring to FIGS. 7A and 7B, differences between the latch device 200 according to the present exemplary embodiment and the latch device 100 that is described above will be discussed.

The structure of the latch device 200 according to the present exemplary embodiment is substantially the same as that of the latch device 100 of the above-described exemplary embodiment, except for a latch arm 210 constituting a latch lever 220. Thus, the same constituent elements have the same reference numerals, for which descriptions will be omitted herein.

Referring to FIGS. 7A and 7B, the latch device 200 according to the present exemplary embodiment includes the latch stop 140 protruding from the side wall 41 of the base 40 and a latch lever 210 pivotably installed on the base 40. The latch stop 140 includes the inclined surface 141 inclined upward and the vertical surface 143 vertically extending from the upper end of the inclined surface 141. The latch lever 210 includes a latch arm 220 having a contact end portion 221 that contacts the inclined surface 141 of the latch stop 140 in the unlatching state. The contact end portion 221 of the latch arm 220 has a chamfer surface 221a. Although the chamfer surface 221a is a flat surface as illustrated in FIGS. 7A and 7B, it may alternatively be a curved surface.

In the latch device 200 according to the present exemplary embodiment, since the chamfer surface 221a is formed on the contact end portion 221 of the latch arm 220 that directly contacts the inclined surface 141 of the latch stop 140, as the latch lever 210 contacts and ascends along the inclined surface 141 of the latch stop 140 during an unlatching operation, the latch lever 210 may smoothly ascend along the inclined surface 141 of the latch stop 140 during an unlatching operation to the position where the upper clearance of the latch lever 210 is removed.

Accordingly, according to the latch device 200 according to the present exemplary embodiment, during the unlatching operation, the latch lever 210 may be prevented from being stopped before the latch lever 210 arrives at the position where the upper clearance of the latch lever 210 is removed, not overcoming the friction force between the contact end portion 221 of the latch arm 220 and the inclined surface 141 of the latch top 140.

Figure 8A:
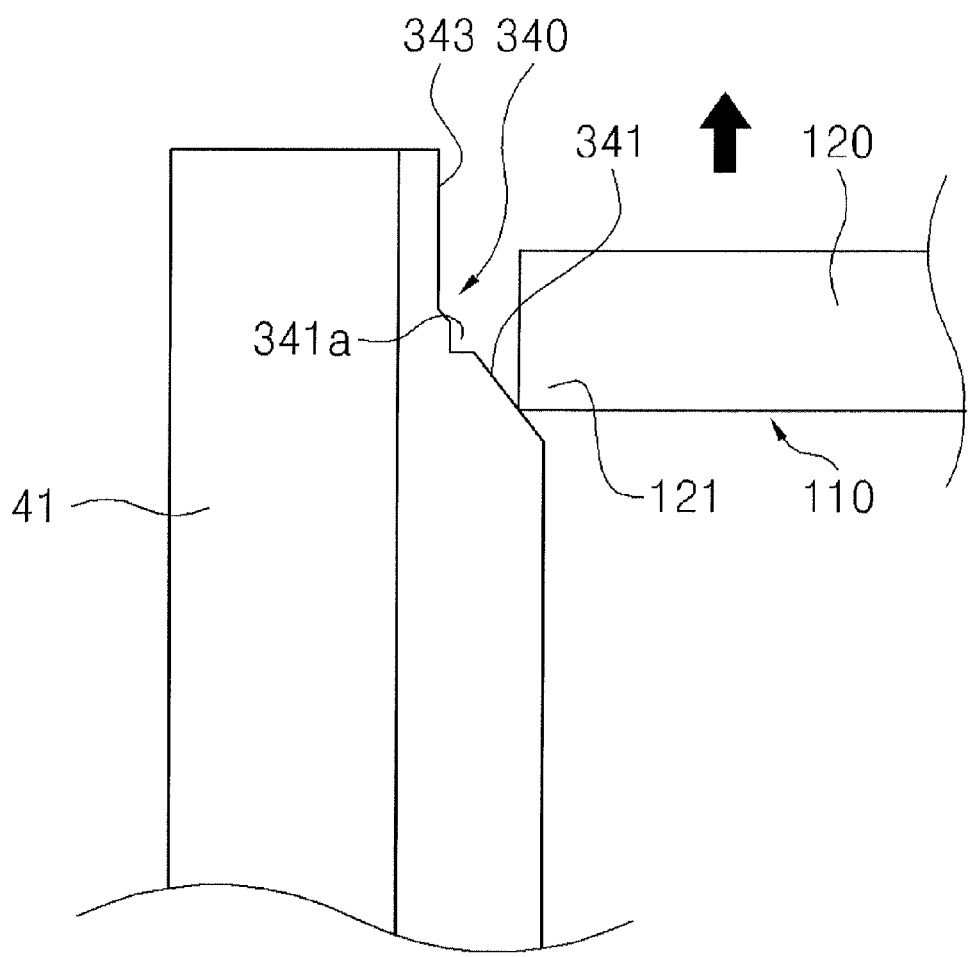
FIGS. 8A and 8B are schematic views explaining the operation of a latch device according to another exemplary embodiment of the present inventive concept.
Figure 8B:
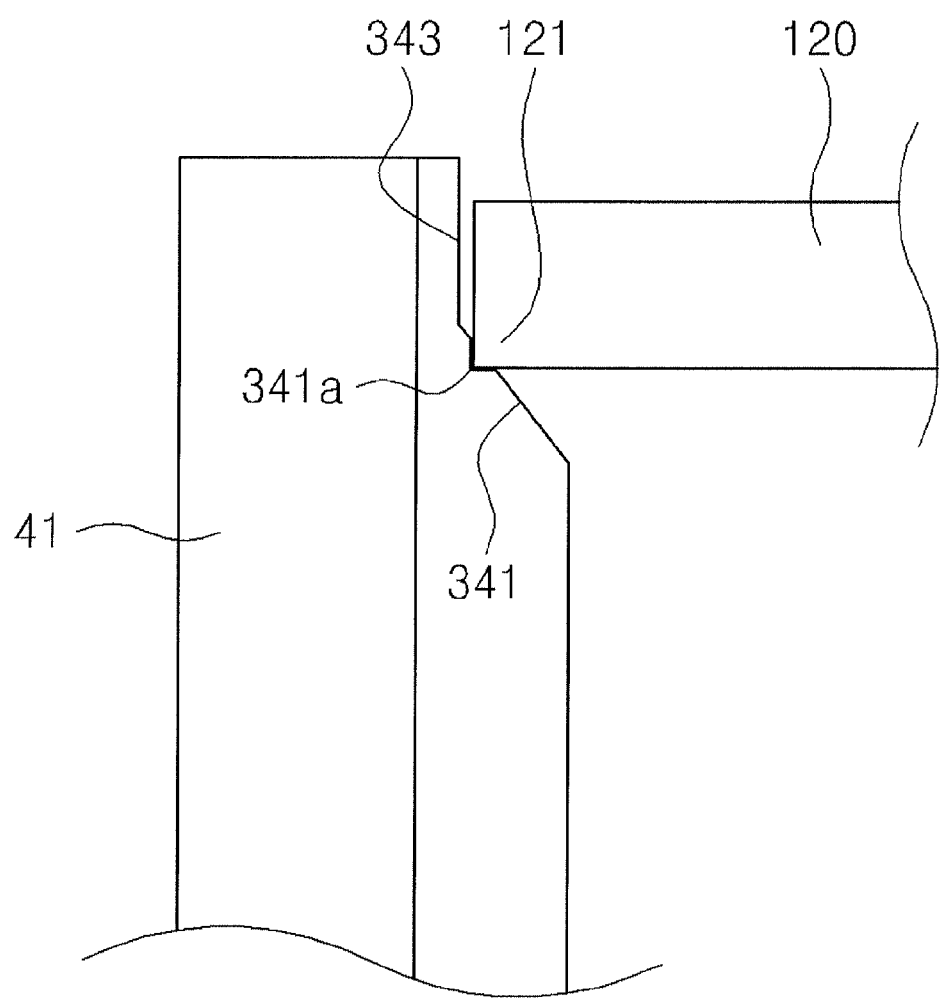

FIGS. 8A and 8B are schematic views explaining the operation of a latch device 300 according to another exemplary embodiment of the present inventive concept. Referring to FIGS. 8A and 8B, differences between the latch device 300 according to the present exemplary embodiment and the latch device 100 that is described above will be discussed.

The structure of the latch device 300 according to the present exemplary embodiment is substantially the same as that of the latch device 100 of the above-described exemplary embodiment, except for an inclined surface 341 constituting a latch stop 340. Thus, the same constituent elements have the same reference numerals, for which descriptions will be omitted herein.

Referring to FIGS. 8A and 8B, the latch device 300 according to the present exemplary embodiment includes the latch stop 340 protruding from the side wall 41 of the base 40 and the latch lever 110 pivotably installed on the base 40. The latch stop 340 includes the inclined surface 341 inclined upward and a vertical surface 343 vertically extending from the upper end of the inclined surface 341. The latch lever 110 includes the latch arm 120 having the contact end portion 121 that contacts the inclined surface 341 of the latch stop 340 in the unlatching state. An accommodation groove 341a in which the contact end portion 121 of the latch arm 120 is accommodated is formed in the inclined surface 341 of the latch stop 340. The accommodation groove 341a is formed on the inclined surface 341 at a position where the latch lever 110 ascends, that is, a position where the upper clearance of the latch lever 110 is removed, or a position adjacent thereto. Although in the present exemplary embodiment the accommodation groove 341a has a V shape suitable for the contact end portion 121 having an angled shape, the shape of the accommodation groove 341a may be appropriately selected according to the shape of the contact end portion 121.

In the latch device 300 according to the present exemplary embodiment, in the unlatching state, since the accommodation groove 341a where the latch lever 110 is accommodated is formed in the inclined surface 341 of the latch stop 340 that contacts and supports the latch lever 110, the contact end portion 121 of the latch arm 120 is accommodated in the accommodation groove 341a of the inclined surface 341 at the position where the latch lever 110 ascends, so that the ascending position of the latch lever 110 may be stably maintained in the unlatching state.

As described above, according to the present inventive concept, since the latch device includes the latch stop having the inclined surface and the latch lever that contacts the inclined surface of the latch stop and ascends along the inclined surface during the rotation in the unlatching direction, the upper clearance of the latch lever is removed in the unlatching state of the latch device. Thus, when an external shock or vibration is applied to the HDD, the latch lever is prevented from being shaken or vibrating in the vertical direction. Accordingly, the phenomenon, in which an error is generated during the recording operation or reading operation of the HDD due to the internal shock that is generated as the latch lever is shaken or vibrates in the vertical direction, may be prevented.

While the inventive concept has been particularly shown and described with reference to exemplary embodiments thereof, it will be understood that various changes in form and details may be made therein without departing from the spirit and scope of the following claims.

For example, although the above-described exemplary embodiments are all about the ramp loading type HDD in which a magnetic head is parked on a ramp installed outside a disk, the present inventive concept may be applied to the CSS type HDD in which the magnetic head is parked in a parking zone provided in the inner circumferential side of the disk in contact with the parking zone.

What is claimed is:

1. A hard disk drive comprising:
   a base;
   an actuator arm pivotably installed on the base; and
   a latch device to latch the actuator arm at a parking position,
   wherein the latch device comprises:
   a latch stop protruding from a side wall of the base and having an inclined surface; and
   a latch lever pivotably installed on the base and contacting and sliding along the inclined surface of the latch stop during the rotation in an unlatching direction.

2. The hard disk drive of claim 1, wherein the inclined surface of the latch stop is a flat surface.

3. The hard disk drive of claim 2, wherein the inclined surface of the latch stop has an inclination angle within a range of 15-25 degrees.

4. The hard disk drive of claim 1, wherein the inclined surface of the latch stop is a curved surface that is curved inwardly toward the base.

5. The hard disk drive of claim 1, wherein an accommodation groove in which the latch lever is accommodated is formed in the inclined surface of the latch stop to stably maintain an ascending position of the latch lever in an unlatching state.

6. The hard disk drive of claim 5, wherein the accommodation groove of the latch stop has a V shape.

7. The hard disk drive of claim 1, wherein the latch lever comprises:
   a latch arm having a contact end portion contacting the latch stop in the unlatching state; and
   a counterbalance disposed at the opposite side of the latch arm with respect to a rotation center of the latch lever.

8. The hard disk drive of claim 7, wherein the contact end portion of the latch arm has a chamfer surface to allow the latch lever to smoothly ascend along the inclined surface of the latch stop during the rotation in the unlatching direction.

9. The hard disk drive of claim 7, wherein torque to rotate the latch lever in the unlatching direction is provided by a magnetic force acting between a steel core provided in the counterbalance and a magnet provided in a voice coil motor.

10. The hard disk drive of claim 1, wherein the latch lever ascends along the inclined surface of the latch stop to a position where an upper clearance of the latch lever is removed during the rotation in the unlatching direction.

11. The hard disk drive of claim 10, wherein the latch lever is arranged between a top yoke of a voice coil motor and the base, and the upper clearance is a gap between the latch lever and the top yoke.

* * * * *